(12) United States Patent
David Filho et al.

(10) Patent No.: US 7,258,780 B2
(45) Date of Patent: Aug. 21, 2007

(54) CORROSION PROTECTION APPARATUS AND METHOD

(75) Inventors: Helio Marins David Filho, Rio de Janeiro (BR); Robert Ribeiro Braga, Rio de Janeiro (BR)

(73) Assignee: Wellstream International Limited, New Castle Upon Tyne (GB)

( * ) Notice: Subject to any disclaimer, the term of this patent is extended or adjusted under 35 U.S.C. 154(b) by 342 days.

(21) Appl. No.: 10/880,196

(22) Filed: Jun. 29, 2004

(65) Prior Publication Data

US 2005/0284771 A1    Dec. 29, 2005

(51) Int. Cl.
*C23F 13/00* (2006.01)
(52) U.S. Cl. ............... 205/730; 205/731; 205/732; 205/733; 205/740; 204/196.01; 204/196.17; 204/196.2; 204/196.23; 204/196.24; 204/196.25; 204/196.3; 204/196.31; 204/196.33; 204/196.34; 204/196.37

(58) Field of Classification Search ............. 205/730, 205/731, 732, 733, 740; 204/196.01, 196.17, 204/196.2, 196.23, 196.24, 196.25, 196.3, 204/196.31, 196.33, 196.34, 196.37
See application file for complete search history.

(56) References Cited

U.S. PATENT DOCUMENTS

| | | | |
|---|---|---|---|
| 2,542,224 A | 2/1951 | Werner | |
| 4,284,488 A | 8/1981 | Brittain et al. | |
| 4,309,263 A | 1/1982 | Boyd | |
| 4,705,331 A * | 11/1987 | Britton | 439/387 |
| 4,877,354 A | 10/1989 | Williamson | |
| 5,902,463 A | 5/1999 | Terrase | |
| 6,461,082 B1 | 10/2002 | Smith | |

FOREIGN PATENT DOCUMENTS

| | | |
|---|---|---|
| DE | 19753097 | 6/1999 |
| EP | 0 219 472 | 4/1987 |

OTHER PUBLICATIONS

International Search Report and Written Opinion of the International Searching Authority, mailed Mar. 8, 2006, for International Application No. PCT/GB2005/001955.

* cited by examiner

*Primary Examiner*—Bruce F. Bell
(74) *Attorney, Agent, or Firm*—Klarquist Sparkman, LLP

(57) ABSTRACT

An apparatus and method for protecting a structure from corrosion, according to which the apparatus includes two pivotally connected members, at least one anode device connected to at least one of the members, and a resilient component engaged with the members.

39 Claims, 11 Drawing Sheets

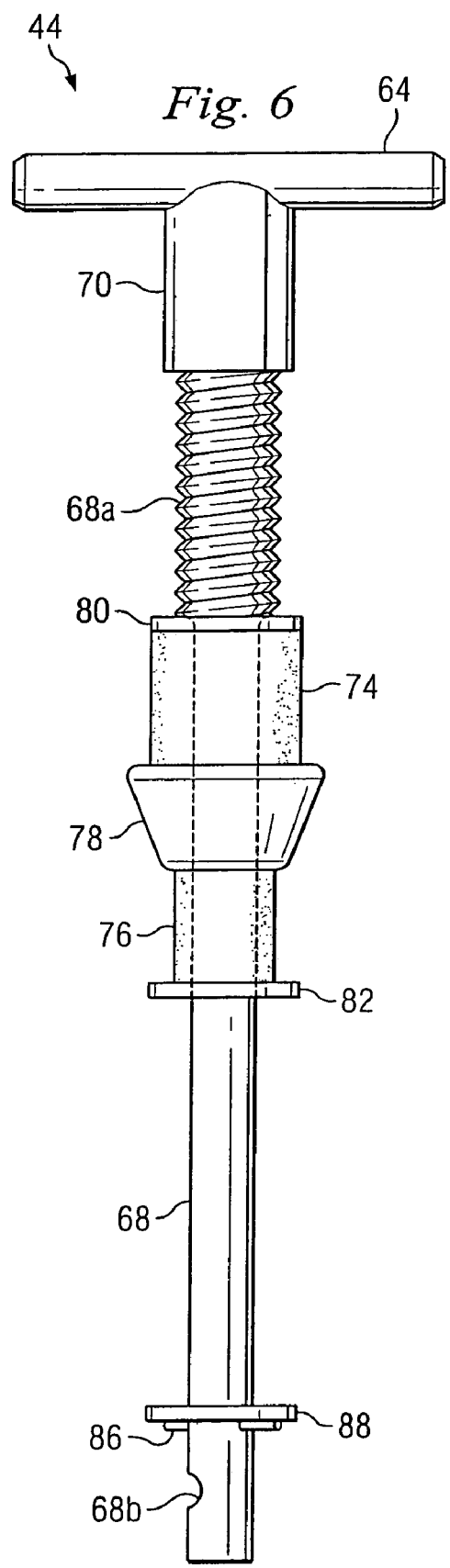

CORROSION PROTECTION APPARATUS AND METHOD

BACKGROUND

This invention relates, in general, to the corrosion protection of a structure that is exposed to wet, gaseous and/or below-ground environments wherein either water or a thin film of condensed moisture covers at least a portion of the structure. In these types of environments, an electrochemical process, often referred to as corrosion, can destroy the material of the structure.

While undergoing corrosion, the structure has two areas, an anodic site (or anode) where the corrosion occurs and from which electrons flow, and a cathodic site (or cathode) to which the electrons flow. Sacrificial anode devices have been used to prevent the corrosion. A sacrificial anode device includes one or more anodes from which electrons flow into the structure, thereby intentionally corroding the anodes while lowering the potential of the structure to such a value that no anodic sites form, that is, no corrosion occurs. The sacrificial anode device is usually replaced as its anodes near destruction.

The installation or replacement of a typical sacrificial anode device is usually costly and time-intensive, and sometimes requires the interruption of the operation of the system of which the structure to be protected is a part. For example, the replacement of a sacrificial anode device connected to an underwater flexible pipe usually requires raising the flexible pipe out of the water.

Therefore, what is needed is a sacrificial anode device that may be quickly and easily installed or replaced in situ, without moving the structure to be protected or interfering with its normal operation.

BRIEF DESCRIPTION OF THE DRAWINGS

FIG. 6 is an elevation view of a stem of the clamp of FIG. 1.

DETAILED DESCRIPTION

Figure 1:
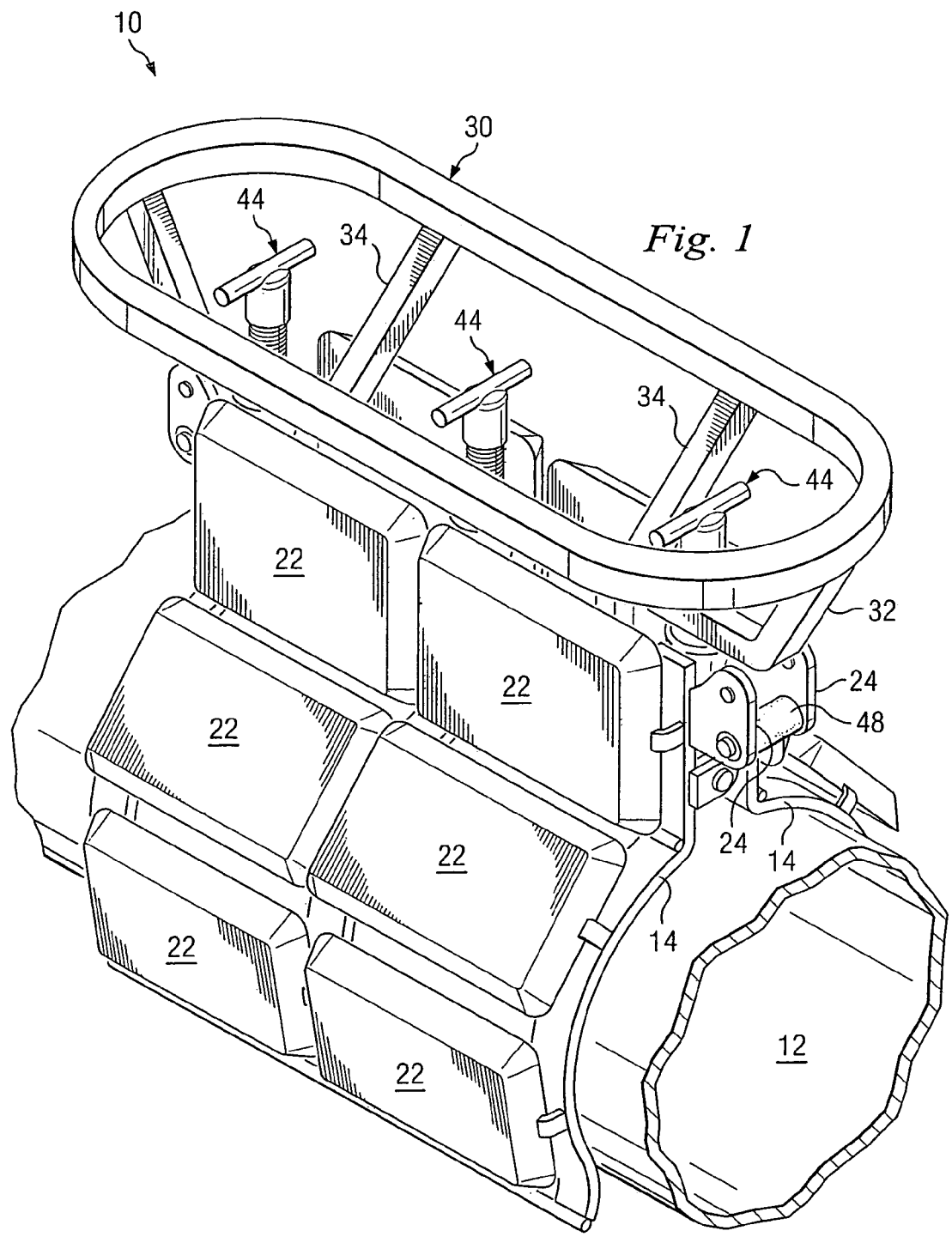
FIG. 1 is an perspective view of an anode protection clamp installed onto a cylindrical structure.
Figure 2A:
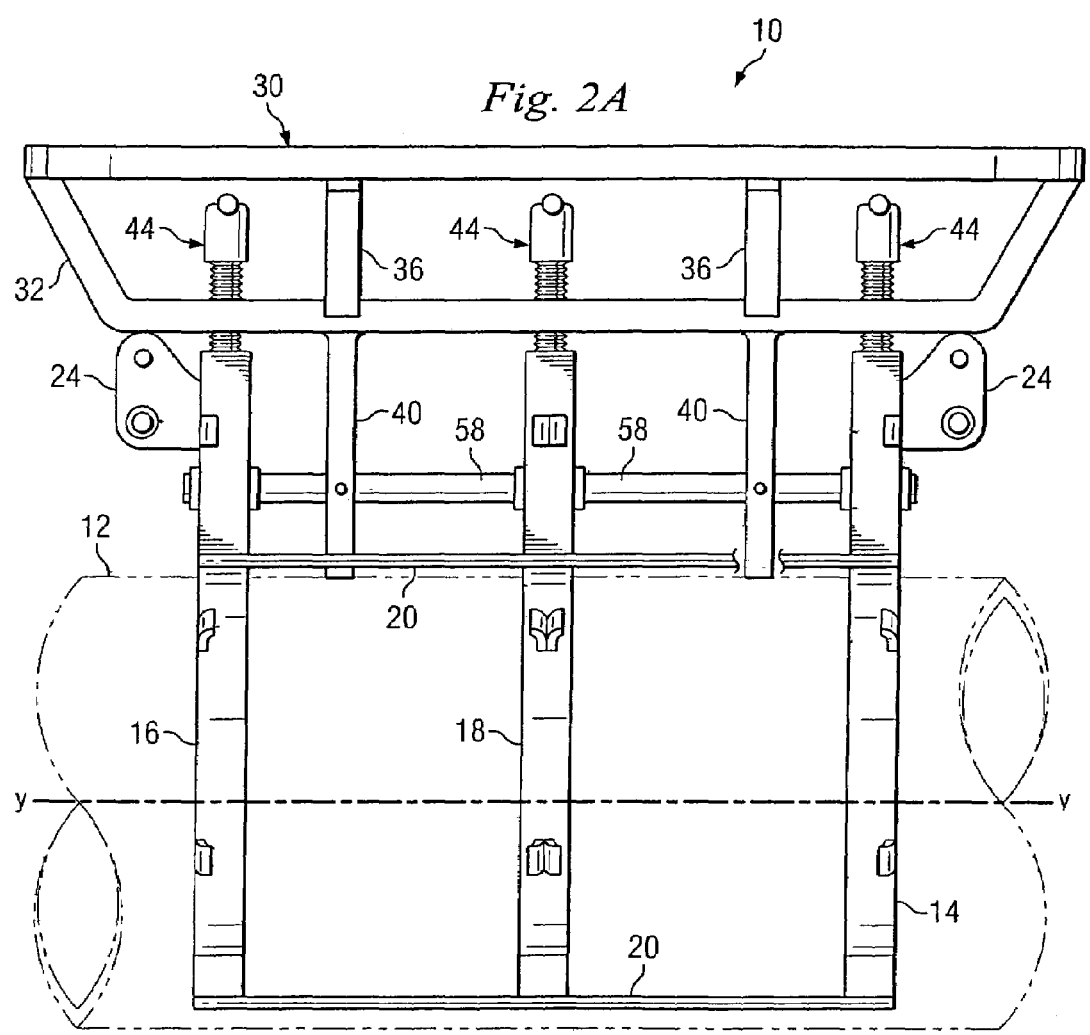
FIG. 2A is a side view of the clamp of FIG. 1, the clamp including a generally U-shaped center bar 32 and a plurality of bars 20.
Figure 2B:
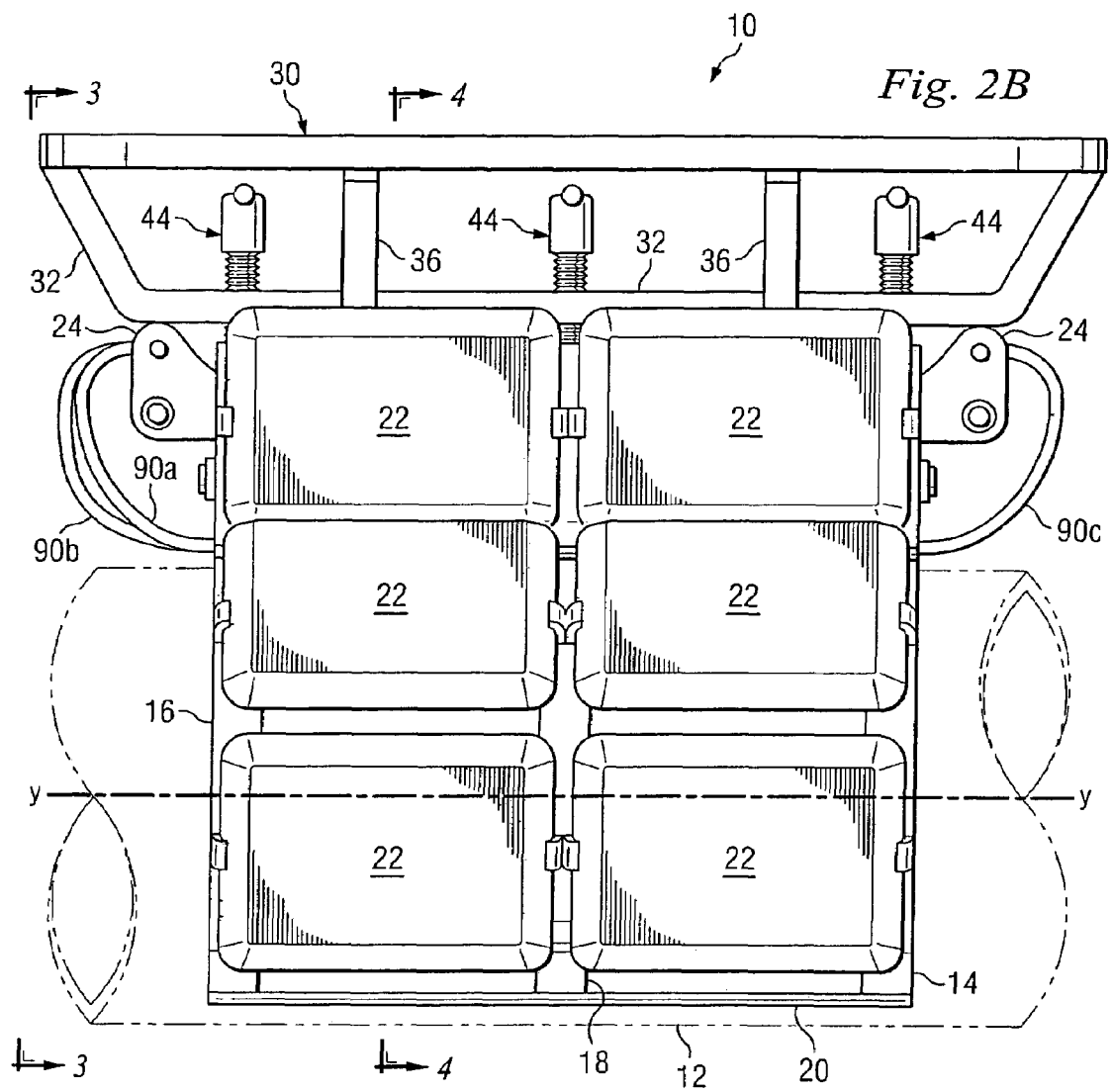
FIG. 2B is a view similar to that of FIG. 2A but depicting a plurality of anodes connected to the clamp.
Figure 3:
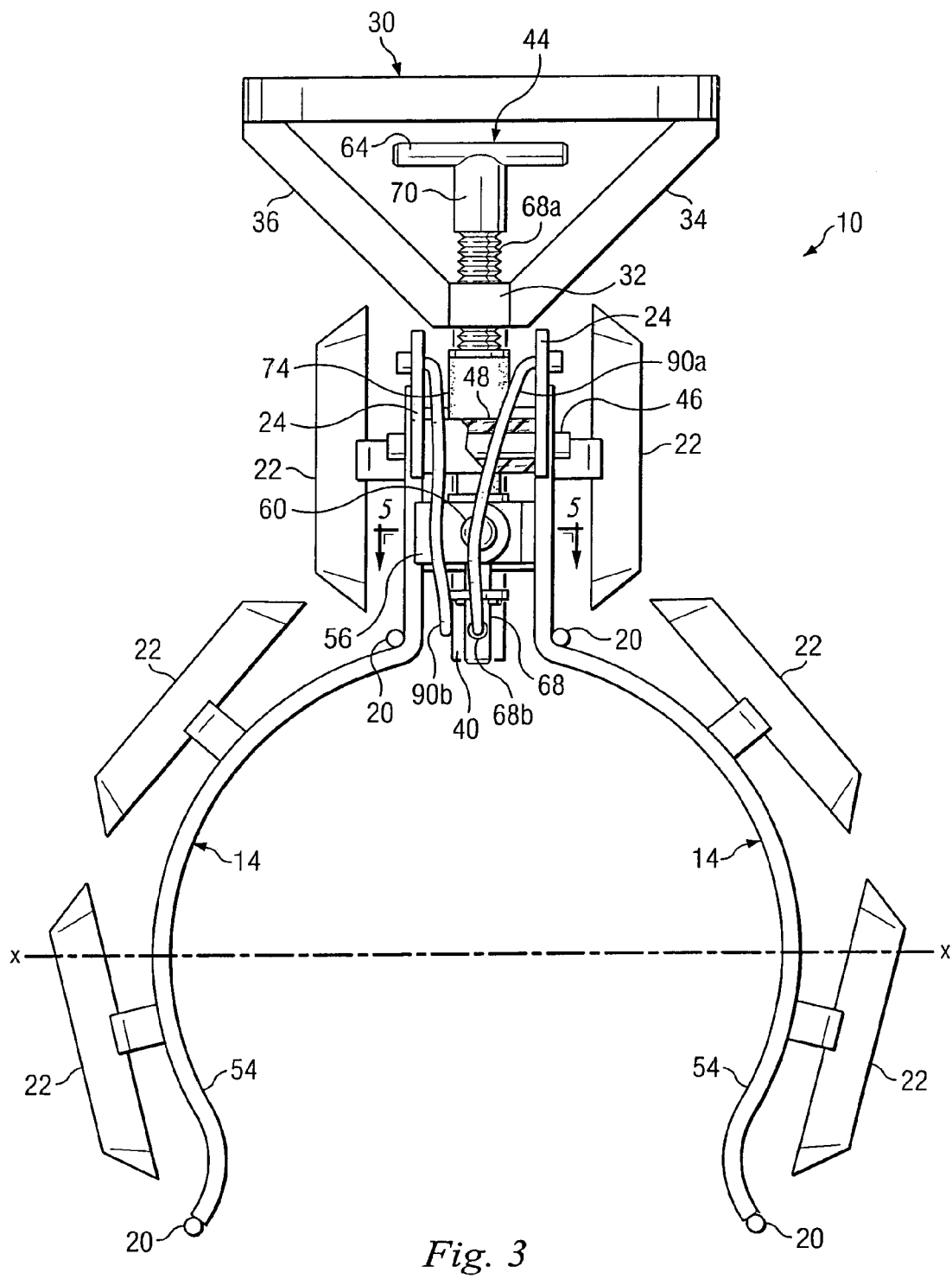
FIG. 3 is an end view taken along the line 3-3 of FIG. 2B, but with the end portions of the generally U-shaped center bar 32 removed for clarity.

Referring to FIGS. 1-3, an anode protection clamp according to an embodiment is generally referred to by reference numeral 10 which is designed to be mounted on a cylindrical structure 12, which can be in the form of a metal pipe, or the like.

The clamp 10 includes three pairs of spaced arcuate arms 14, 16 and 18 with the arms 18 extending between the arms 14 and 16. (Only one arm of each pair is shown in FIGS. 2A and 2B and only one pair of arms 14 is shown in FIG. 3.)

As shown in FIG. 3, each arm 14 includes a curved arcuate portion and a straight portion extending from the arcuate portion. The arrangement is such that the opposed arcuate portions of each pair of arms 14 from a partial circle that envelopes a portion of the structure in the clamping position of the clamp 10, and the straight portions extend in a spaced, parallel relation. The arms 16 and 18 are identical to the arms 14. Two bars 20 run along the entire length of the clamp 10 and are connected to each of the arms 14, 16, and 18 on each side of the clamp.

Three anodes 22 are mounted between each outer arm 14 and 16 and its corresponding middle arm 18, resulting in six anodes per side of the clamp 10 and a total of twelve anodes for the entire clamp. The anodes 22 are welded to the arms 14, 16 and 18 and are composed of an alloy material such as an aluminum alloy. The anodes 22 have been omitted from FIG. 2A in the interest of clarity.

As better shown in FIG. 2A, each outer arm 14 and 16 includes a padeye 24 mounted on the straight portion of each arm and extending away from the center of the clamp 10.

A generally elliptical-shaped frame 30 (FIG. 3) is provided and a generally U-shaped center bar 32 is connected, at its ends, to the frame. The respective ends of two spaced bars 34 are connected between one side of the frame 30 and the bar 32, and the ends of two additional spaced bars 36 are connected between the other side of the frame 30 and the base of the bar 32, and opposite the bars 34.

Two vertical bars 40 (FIG. 2A) extend downwardly from the bar 32 as viewed in the drawing, to the structure 12 when the clamp 10 is in its clamping position, as will be described.

Three laterally-spaced locking elements or stems 44 are threadably engaged through corresponding threaded openings formed in the base of the center bar 32. The stems 44 will be described in detail later.

As shown in FIG. 3, a pin 46 extends between the padeyes 24 with its ends being connected to the padeyes, and an elastomer spring 48 extends around the pin 46. It is understood that an identical spring and pin are also associated with the arms 16.

The arms 14, 16, and 18 have inner surfaces 54 and it is understood that a portion of the surfaces 54 may be grooved (not shown). The grooves on the surfaces 54 may begin, for example, at about the axis x-x (as shown in FIG. 3) and continue to the bars 20 at the bottom ends of the arms 14, 16, and 18.

Figure 5:
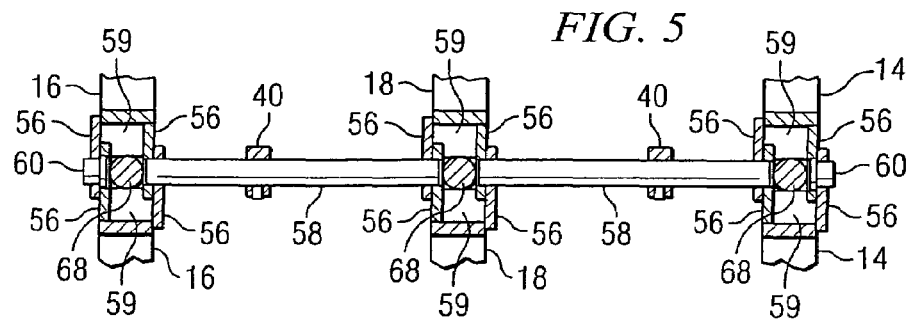
FIG. 5 is a sectional view taken along the line 5-5 of FIG. 3, but with the bars 20 removed for clarity.
Figure 4:
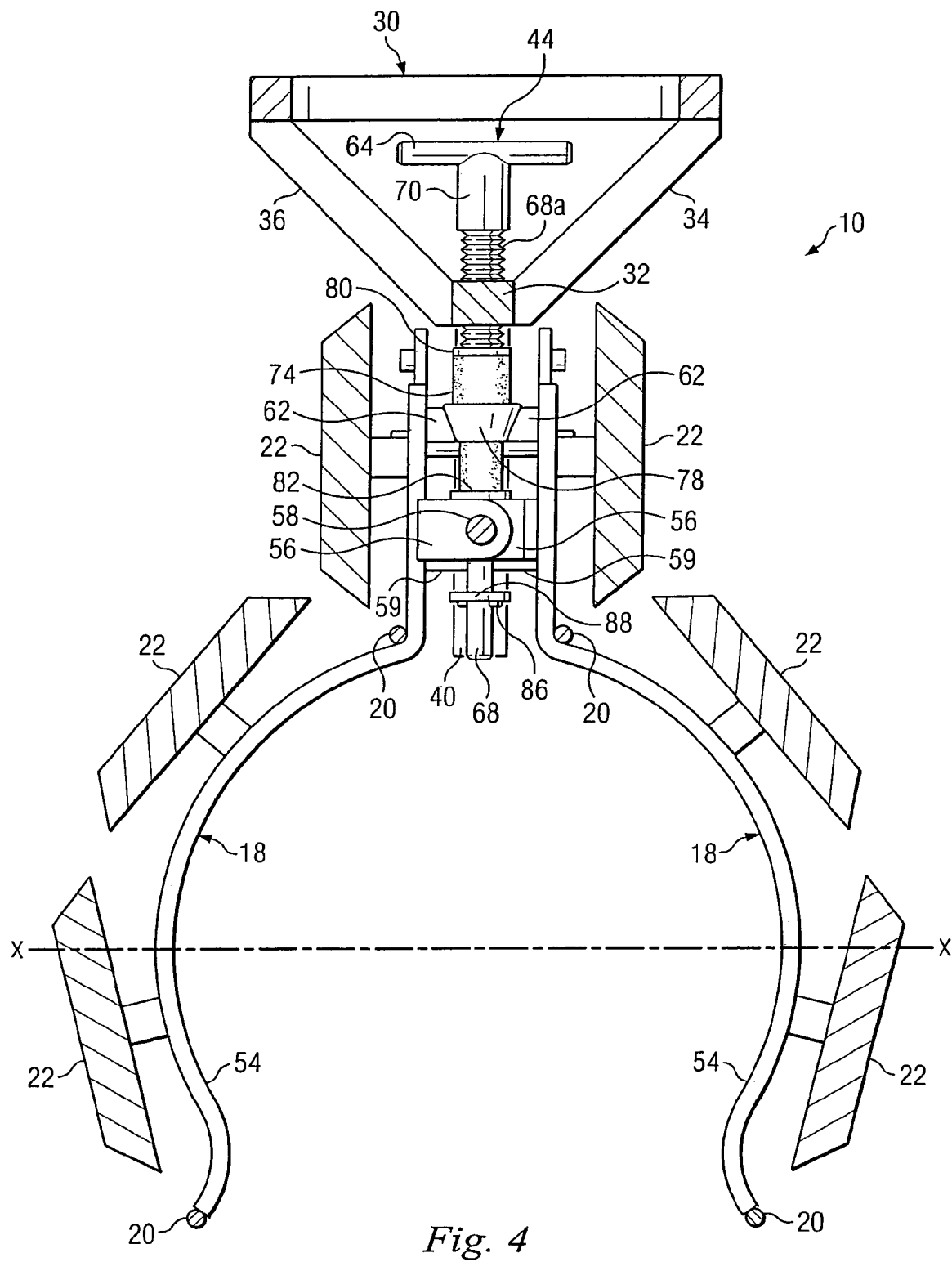
FIG. 4 is a sectional view taken along the line 4-4 of FIG. 2B, but with an end portion of the generally U-shaped center bar 32 removed for clarity.

Referring to FIGS. 4 and 5, two eyelets 56 extend from the vertical portions of the arms 14, 16, and 18, and towards the corresponding arm on the other side of the clamp 10. The eyelets of each arm 14, 16, and 18 of each pair of arms overlap so that their respective openings are aligned. A shaft 58 extends through the aligned openings in the eyelets 56 as well as through openings extending through the bars 40, and a plate 59 connects the two bottom surfaces of the two eyelets 56 on each arm 14, 16, and 18, for reasons to be described.

A pin 60 is disposed through each pair of corresponding eyelets 56 of the arms 14 and 16 positioned towards the outside ends of the clamp 10 so that the latter arms 14 and 16 are able to rotate about the pins 60 with the degree of rotation being limited by the elastomer springs 48 (FIG. 3).

Each arm 14, 16, and 18 also includes an inwardly directed wedge member 62 positioned on the inner surface of its straight portion for reasons that will be described.

The three stems 44 mentioned above are associated with the three pairs of arms 14, 16, and 18, respectively, and the details of each stem 44 are shown in FIG. 6. Each stem 44 includes a cross handle 64 disposed at one end of a shaft 68 that extends for the length of the stem. A sleeve 70 extends around the upper end portion of the shaft 68, and a portion 68a of the shaft extending adjacent the sleeve is externally threaded. A pair of spaced elastomer springs 74 and 76 extend around the shaft 68 to either end of a conical stop 78, and a pair of washers 80 and 82 also extend around the shaft 68 and are disposed at the respectively outer ends of the springs. A pin 86 extends through the lower portion of the stem 44, as viewed in FIG. 6, and a washer 88 rests on the upper surface of the pin. An opening 68b is formed in the lower portion of the shaft 68 below the pin 86. The specific function of the above components of the stem 44 will be described in detail.

As shown in FIGS. 3 and 4, the threaded portion 68a of the shaft 68 is in threaded engagement with an internally threaded opening extending through the base of the bar 32, and the conical stop 78 is in a camming engagement with the wedge members 62 of the arms 14, 16, and 18. Thus, when manually rotated by the handle 64 the stem 44 is able to move vertically up or down relative to the arms 14, 16, and 18 and the frame 30 causing the stop 78 to move relative to the members 62, resulting in corresponding movement of the arms 14, 16, and 18, under conditions to be described.

Figure 7:
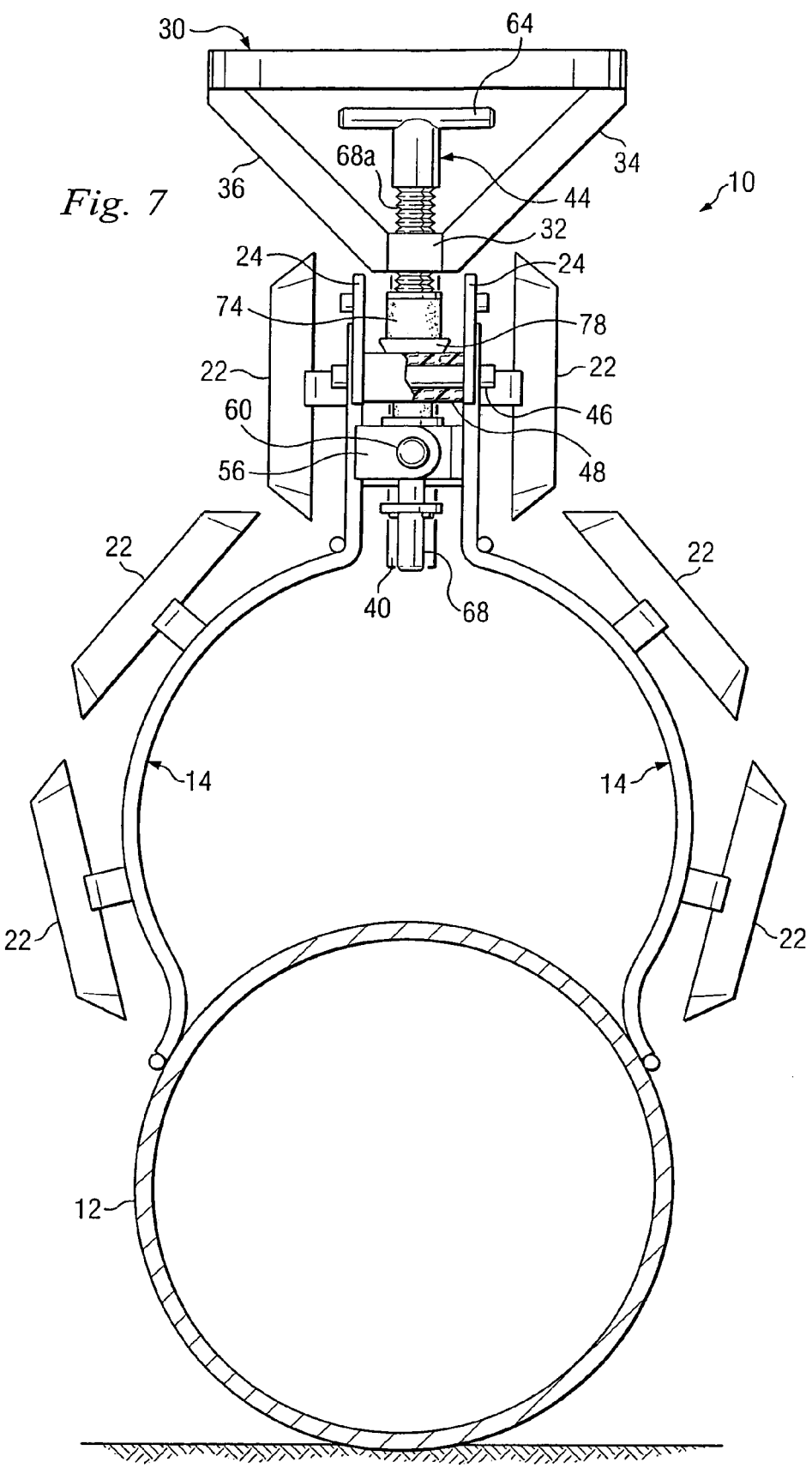
FIG. 7 is a view similar to that of FIG. 3 but depicting the clamp extending over a cylindrical structure to be protected.

The operation of the above embodiment will be described, for the purpose of example, under the assumption that the cylindrical structure 12 is an end fitting of an underwater pipeline resting on the sea bottom. It is understood that the installation and removal procedures to be described may be performed by either a human diver, a remotely operated vehicle or the like, or a combination thereof. As shown in FIG. 7, the clamp 10 is positioned directly above the structure 12, with the distal ends of the arms 14, 16, and 18 touching the upper portion of the structure 12. In this position, the elastomer springs 48 maintain the clamp 10 in its normal, at rest, position.

The clamp 10 is then pushed downwardly, as viewed in FIG. 7, towards the horizontal surface (or the sea bottom) which forces the arms 14, 16, and 18 open due to the camming action provided by the cylinder surface of the structure 12. The arms 14, 16, and 18 thus rotate about the shaft 58 and the pins 60 radially outwardly against the resistance provided by the elastomer springs 48 and cause a corresponding compression of the springs.

Figure 8:
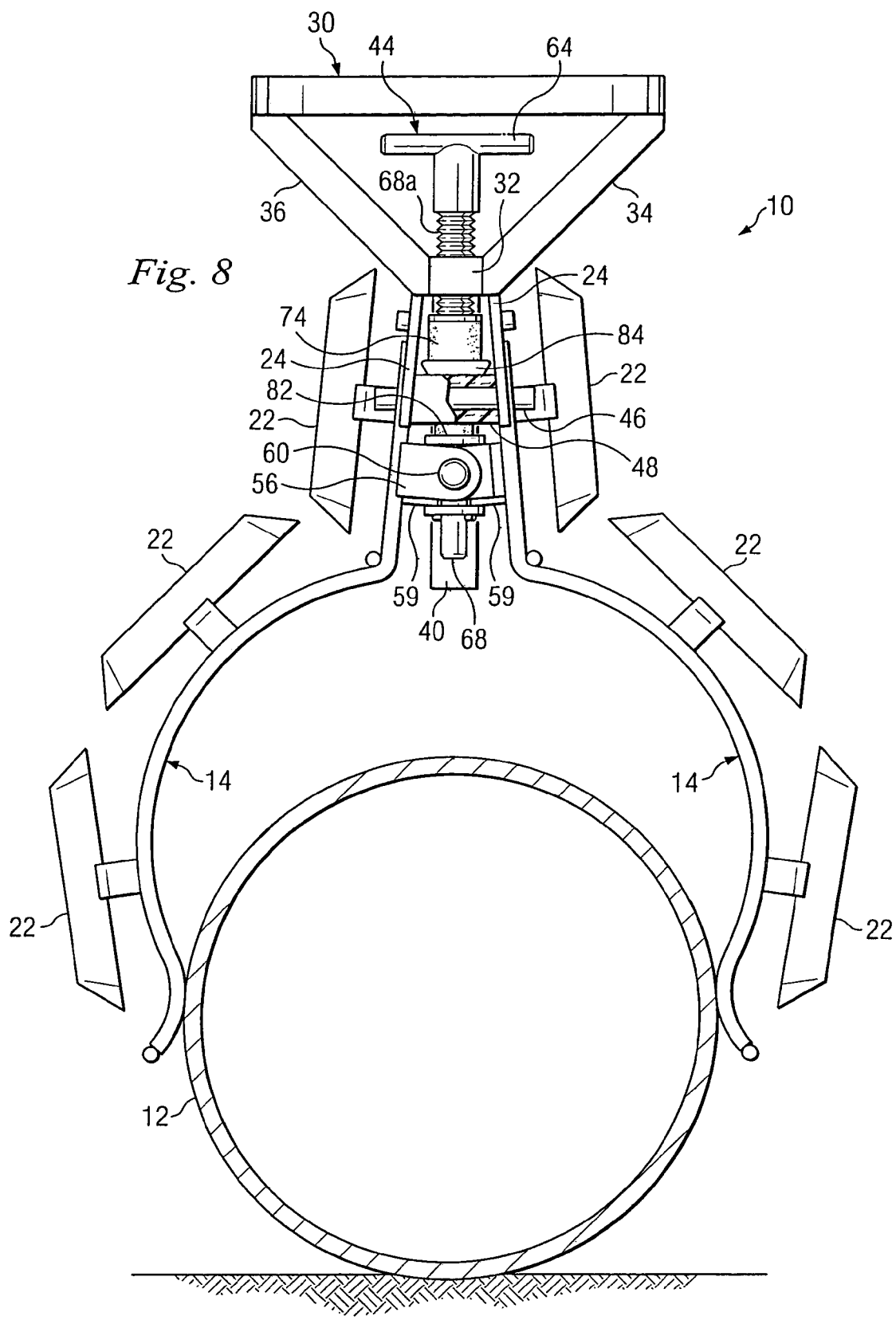
FIG. 8 is a view similar to that of FIG. 7 but depicting the clamp in an intermediate position relative to the structure.

As the clamp 10 is pushed further downwardly relative to the structure 12, the arms 14, 16, and 18 continue to open as shown in FIG. 8, with the distance between the ends of the arms reaching a maximum when the tangential points of the arcs located at the bottom of the arms touch the opposing tangential points of the cylindrical structure 12.

Figure 9:
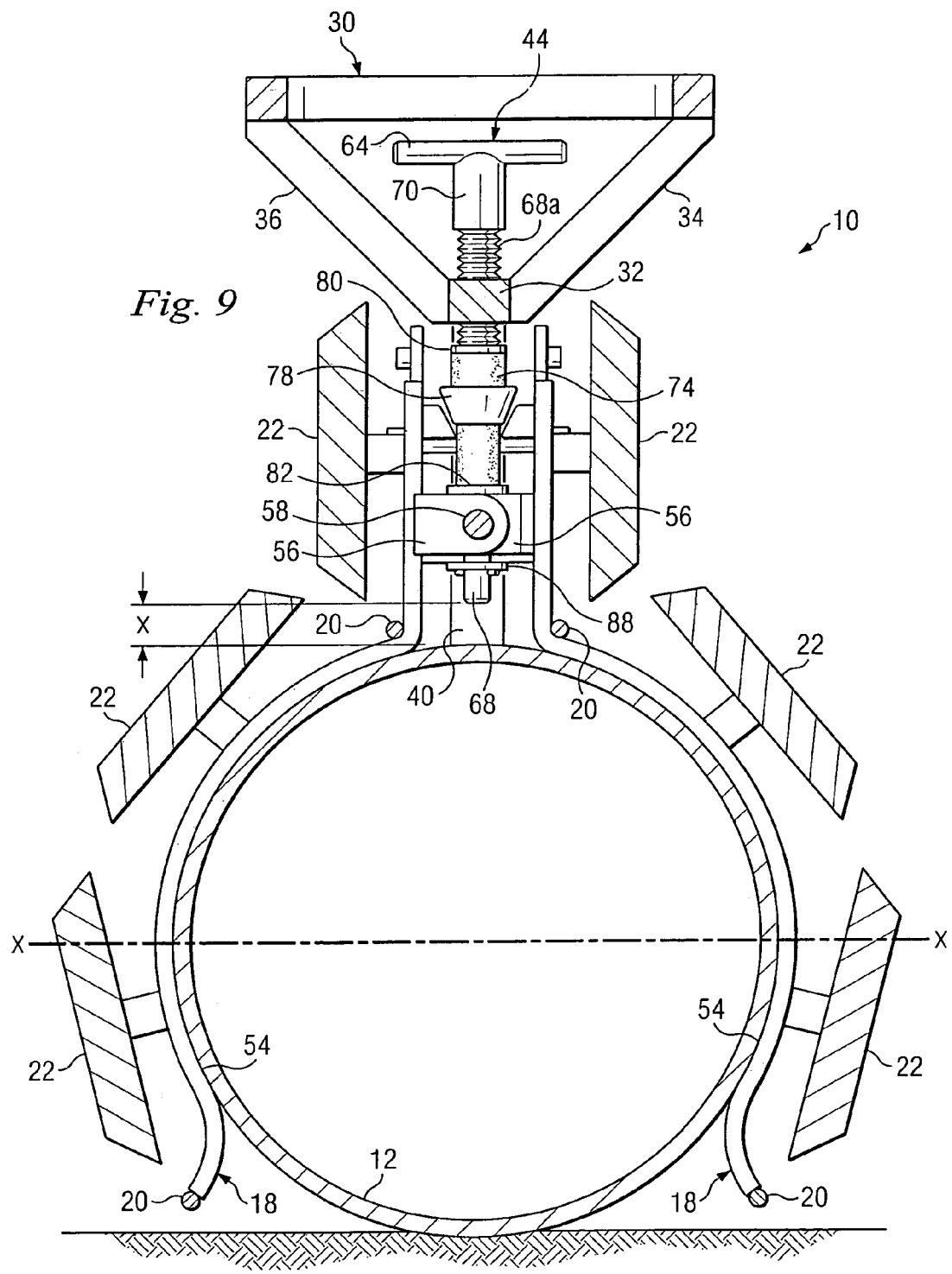
FIG. 9 is a view similar to that of FIG. 4 but depicting the clamp extending over the structure.

Further downward pushing of the clamp 10 relative to the structure 12 continues until the bars 40 contact the cylindrical structure 12 and the clamp takes the position of FIG. 9. In this position, the arms 14, 16, and 18 close around the structure 12 due to the forces exerted by the elastomer springs 48 as they move from their compressed state to their normal, relaxed state. Also, in this position, the lower end of the shaft 68 of each stem 44 is spaced from the upper surface of the structure 12 a distance referred to by the reference letter X in FIG. 9.

Figure 10:
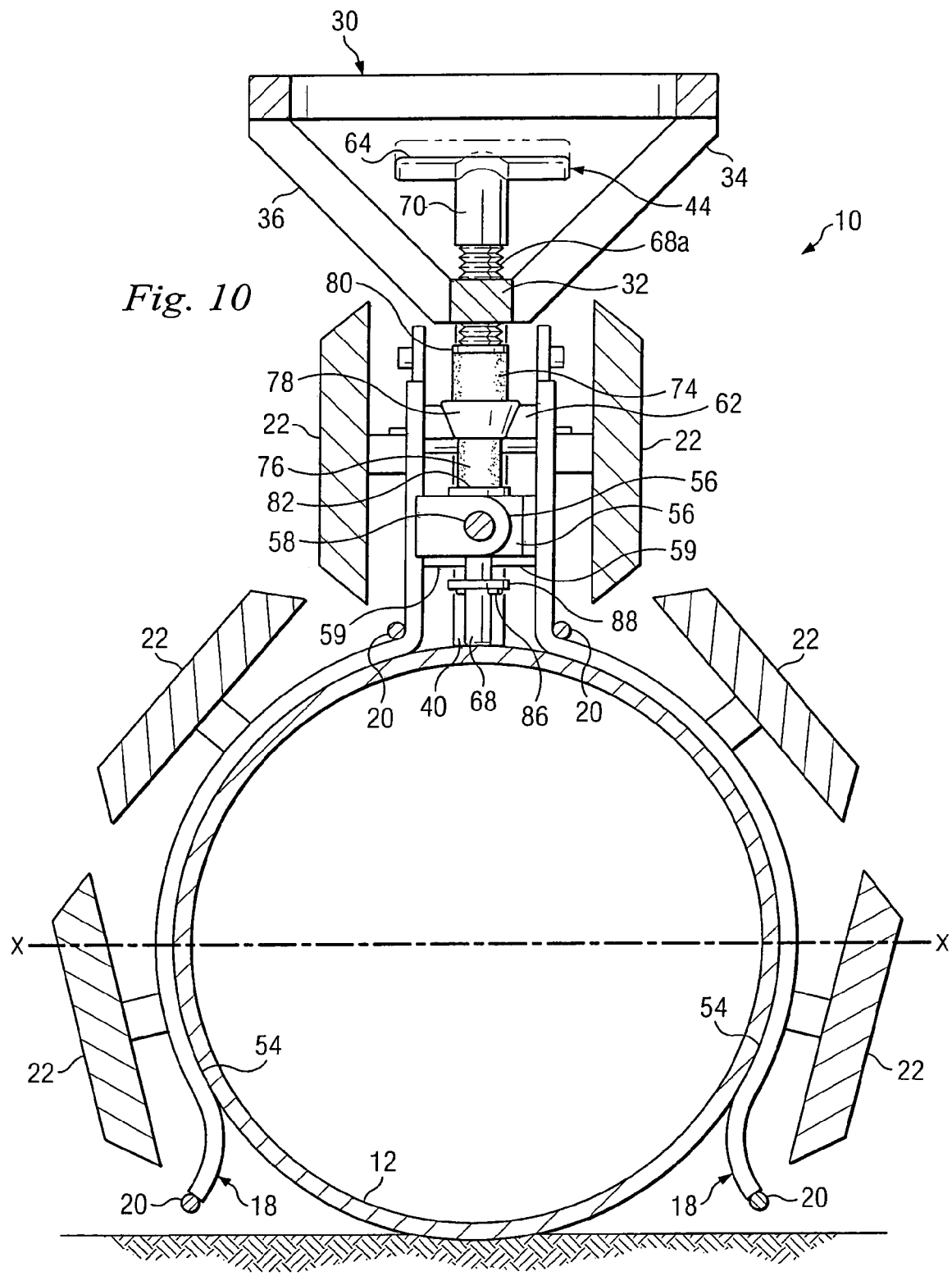
FIG. 10 is a view similar to that of FIG. 9 but depicting the clamp in its final position during operation.

Referring to FIG. 10, the handles 64 of the stems 44 are then manually rotated to lower the stems 44 relative to the structure due to the threaded engagement of the threaded portion 68a of the stems with the internally threaded bar 32. As the stems 44 move downwardly in this manner, the conical stops 78 of the stems slide along the cam surfaces of the wedges 62, thus pivoting the straight portions of the arms 14, 16, and 18 radially outwardly and the arcuate portions radially inwardly about the shafts 58 and the pins 60 to increase the clamping force on the cylindrical structure 12. This continues until the lower ends of the shafts 68 contact the top of the cylindrical structure 12, and the clamp is in its "locked" in position. In this position the washer 82 of each stem engages the top surfaces of the eyelets 56, and the elastomer spring 76 of each stem 44 is compressed between its corresponding conical stop 78 and washer 82, and the elastomer spring 74 of each stem is compressed between its corresponding conical stop 78 and washer 80. It is understood that the aforementioned grooves of the inner surfaces 54 of the arms 14, 16, and 18 may promote adhesion to the cylindrical structure 12.

Once in its final position, the clamp 10 is electrically connected with the cylindrical structure 12 due to the intimate contact between the inner surfaces of the arcuate arms 14, 16, and 18, the lower end of the shaft 68, and the ends of the bars 40 with the corresponding outer surfaces of the structure. Thus the anodes 22 can function in a sacrificial mode to protect the structure from corrosion.

In particular, as corrosion begins to take place on the surfaces of the anodes 22 over time, electrons flow from the anodes 22 to the arms 14, 16, and 18 via the weld joints, and then into the cylindrical structure 12 via the inner surfaces of the arms, by the ends of the shafts 68 of the stems 44, and by the bars 40. It is understood that there may be other electron flow paths from the anodes 22 to the cylindrical structure 12. The cylindrical structure 12 serves as a cathode, with the electrons moving to the surfaces of the structure to combine with oxygen and water molecules in the water. Meanwhile, the positively-charged metal ions on the surfaces of the anodes 22 (produced as a result of the electron flow) discharge into the water, resulting in a partial destruction of the anode 22 surfaces (corrosion). This process continues until all of the anode 22 material is destroyed or nearly destroyed.

The clamp is removed from the cylindrical structure 12 by first manually unscrewing the stems 44. During this upward movement of the stems 44, the conical stops 78 also move upward and out from between the wedges 62 of the arms 14, 16, and 18, thus "unlocking" the arms. The stems 44 are prevented from being completely removed from the clamp 10 by the washers 88 contacting the plates 59 during this upward movement. After the arms 14, 16, and 18 have been unlocked, a diver or a remotely operated vehicle can lift the clamp 10 upwardly in a direction away from the cylindrical structure 12, resulting in the arcuate portions of the arms 14, 16, and 18 rotating away from and unclamping the cylindrical structure 12. Thus, the cylinder structure 12 is unaffected by the above corrosion.

Referring to FIGS. 2B and 3, three electrical cables 90a, 90b, and 90c are provided that promote the flow of electrons from the anodes 22 to the cylindrical structure 12. The cable 90 connects the padeye 24 associated with the arms 16 to the corresponding stem 44, the cable 90b connects the latter padeye with the stem corresponding to the arms 18, and the cable 90c connects the padeye associated with the arms 14 to the corresponding stem 44. Each cable 90a, 90b, and 90c is connected to its corresponding stem 44 via the opening 68b (FIG. 6) formed in the shaft 68 of each stem. Thus, electrons may flow from the arms 14, 16, and 18 to the stems 44 via the electrical cables 112. It is emphasized that the use of the cables 90a, 90b, and 90c is not necessarily required to utilize the anodes 22 to prevent corrosion to the structure 12, but simply further promotes the electron flow in the above manner.

Figure 11:
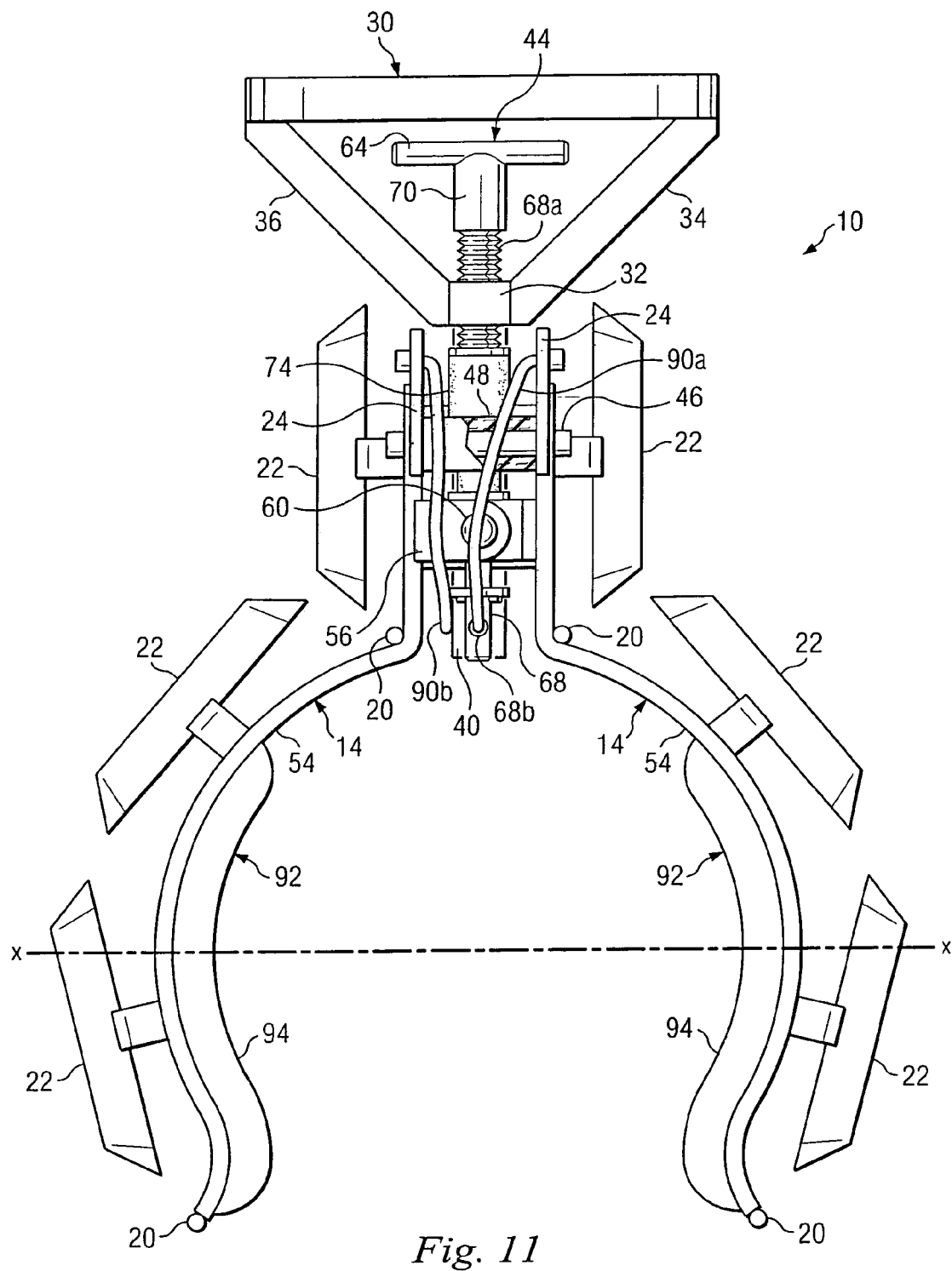
FIG. 11 is a view similar to that of FIG. 3 but depicting inserts connected to the clamp.

Referring to FIG. 11, a pair of inserts 92 are connected to each pair of arms 14, 16 and 18. The inserts 92 are shaped to conform to the inside surfaces 54 of the arms 14, 16, and 18 and to enable the clamp 10 to be used with a cylindrical structure having an outer diameter that is smaller than the outer diameter of the cylindrical structure 12. It is understood that the inserts 92 may be welded or fastened to the arms 14, 16, and 18 in any conventional manner so that the clamp 10 is electrically connected to the smaller cylindrical structure due to the contact between the inserts and the smaller cylindrical structure. It is further understood that inner surfaces 94 of the inserts 92 may be grooved to promote adhesion to the smaller cylindrical structure. Also, multiple sets of inserts 92 may be provided, with each set of inserts accommodating a different outer diameter. Moreover, instead of employing the inserts 92 to accommodate a cylindrical structure having a smaller outer diameter, it is understood that the clamp 10 and/or the arms 14, 16, and 18 could be modified accordingly to accommodate the smaller outer diameter.

VARIATIONS

It is understood that several variations may be made in the foregoing without departing from the scope of the invention. For example, the clamp 10 is not limited to the particular exemplary application discussed above but rather is also well suited for other off-shore and on-shore applications in wet (such as underwater), gaseous (such as air), and below-ground environments. Further, the clamp 10 may be installed onto non-cylindrical structures, such as structures having rectangular cross-sections, and the shapes of the arms 14, 16, and 18 and the inserts 92 may be modified accordingly to conform to the non-cylindrical structures.

Still further, the number of pairs of arms 14, 16, or 18 may be varied from one to an unlimited number. Also, other alloys, such as zinc or magnesium, may be used for the anodes 22. Moreover, the quantity of the anodes 22 in the clamp 10 may be varied from one to an unlimited number, and the anodes may be connected to the arms 14, 16 and 18 with bolts and/or other types of fastening systems in addition to or instead of weld joints. Also, other types of resilient components such as, for example, a helical spring, could be substituted for the elastomer spring 48.

Although only one exemplary embodiment of this invention has been described in detail above, those skilled in the art will readily appreciate that many other modifications are possible in the exemplary embodiment without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents, but also equivalent structures.

What is claimed is:

1. An apparatus for providing corrosion protection, comprising:
    at least two members pivotally connected and adapted to clamp to a structure;
    at least one anode device connected to at least one of the members;
    a resilient component engaged with the; and
    at least one locking element for locking the members to the structure, each locking element comprising a shaft having a handle disposed at one end and a remaining contact end, wherein said shaft is arranged to electrically connect the apparatus to said structure via said contact end when the locking element locks the members to the structure.

2. The apparatus of claim 1 wherein the resilient component resists any pivoting of one of the members away from the other member.

3. The apparatus of claim 1 wherein the anode device is adapted to pass electrons to the structure when the members are clamped to the structure.

4. The apparatus of claim 1 further comprising an insert connected to at least one of the members sothat the members can clamp to an additional structure having at least one dimension that is less than the corresponding dimension of the first-mentioned structure.

5. The apparatus of claim 1 further comprising supporting means connected to the members for supporting the locking element.

6. The apparatus of claim 5 wherein the supporting means is a frame.

7. The apparatus of claim 6 wherein the locking element is threadably engaged with the frame so that the locking element is able to move relative to the supporting means to lock the members to the structure.

8. The apparatus of claim 6 further comprising a bar extending from the frame for preventing further movement of the frame towards the structure after the frame has moved towards the structure.

9. The apparatus of claim 5 wherein the locking element is engaged with the supporting means and is able to move relative to the supporting means to lock the members to the structure.

10. The apparatus of claim 9 further comprising means for preventing the locking element from disengaging from the supporting means.

11. The apparatus of claim 9 wherein the locking element is captured by the members to prevent the locking element from disengaging from the supporting means.

12. The apparatus of claim 9 wherein the locking element comprises a stop operable to engage a protrusion extending from each of the members so that the members are prevented from pivoting away from each other.

13. The apparatus of claim 9 further comprising a cable connected to the locking element and to at least one of the members for passing electrons from the anode device and to the structure.

14. The apparatus of claim 13 wherein the electrons pass from the anode device and through the at least one of the members, the cable and the locking element, and to the structure.

15. The apparatus of claim 5 wherein the members clamp to the structure as the locking element moves towards the structure.

16. The apparatus of claim 5 wherein the members pivot away from each other when they engage the structure as the supporting means moves towards the structure.

17. The apparatus of claim 16 further comprising a stop connected to the members so that the stop prevents the supporting means from moving further towards the structure.

18. The apparatus of claim 1 wherein each member is an arm.

19. The apparatus of claim 18 further comprising a pin connected to the arms and extending through the resilient component for supporting same.

20. The apparatus of claim 19 wherein each of the arms comprises a portion that is parallel to the other and the pin is connected to the parallel portions.

21. The apparatus of claim 20 wherein the structure is cylindrical and wherein each of the arms further comprises an arcuate portion that engages the structure.

22. The apparatus of claim 18 further comprising a frame connected to the arms and wherein the locking element is engaged with the frame.

23. The apparatus of claim 22 further comprising two additional pivotally connected arms connected to the frame and to the first-mentioned arms for clamping to the structure.

24. The apparatus of claim 23 wherein the anode device is connected to at least one of the first-mentioned arms and to at least one of the arms of the additional arms.

25. A kit comprising:
an apparatus as claimed in claim 1; and
at least one insert connectable to the at least one member so that the at least one member can clamp to an additional structure having at least one dimension that is less than the corresponding dimension of the first-mentioned structure.

26. The kit of claim 25 wherein the anode device is adapted to pass electrons to the structure when the at least two members are clamped to the structure.

27. The kit of claim 25 wherein the apparatus further comprises a bar for preventing further movement of the apparatus in a direction towards the structure after the apparatus has moved in the direction towards the structure.

28. The kit of claim 25 wherein the apparatus further comprises a resilient component engaged with the members for resisting any pivoting of one of the members away from the other member.

29. A method of protecting a structure from corrosion, comprising the steps of:
moving an apparatus in a direction towards the structure so that two arms of the apparatus engage the structure and the structure forces the arms away from each other;
continuing the step of moving so that the arms clamp to the structure;
locking the arms to the structure by screwing a shaft of a locking element towards the structure; and
providing a path for electrons to pass from the apparatus and to the structure at least via a contact end of the shaft when the locking element locks the arms to the structure.

30. The method of claim 29 further comprising connecting an anode device to at least one of the arms so that the electrons pass from the anode device, through the at least one of the arms and to the structure.

31. The method of claim 29 wherein the step of locking comprises moving the locking element relative to the arms so that the arms are unable to move away from each other.

32. The method of claim 31 wherein the step of providing comprises connecting a cable to at least one of the arms and to the locking element wherein a portion of the electrons pass from an anode device connected to one of the arms and through the at least one of the arms, the cable and the locking element, and to the structure.

33. The method of claim 29 wherein the step of moving comprises pivotally connecting the arms so that the arms pivot away from each other when the structure forces the arms away from each other.

34. An apparatus for providing corrosion protection, comprising:
at least one member for clamping to a structure;
at least one anode device connected to the at least one member;
at least one insert connected to the at least one member so that the at least one member can clamp to an additional structure having at least one dimension that is less than the corresponding dimension of the first-mentioned structure; and
at least one locking element for locking the members to the structure, each locking element comprising a shaft having a handle disposed at one end and a remaining end contact end, wherein said shaft is arranged to electrically connect the apparatus to said structure via said contact end when the locking element locks the members to the structure.

35. The apparatus of claim 34 wherein the anode device is adapted to pass electrons to the additional structure when the at least one member is clamped to the additional structure.

36. The apparatus of claim 34 further comprising a bar connected to the at least one member for preventing further movement of the apparatus in a direction towards the additional structure after the apparatus has moved in the direction towards the additional structure.

37. The apparatus of claim 34 wherein there are two members which are pivotally connected.

38. The apparatus of claim 37 further comprising means for locking the members to the additional structure.

39. The apparatus of claim 37 further comprising a resilient component engaged with the two members for resisting any pivoting of one of the members away from the other member.

* * * * *

UNITED STATES PATENT AND TRADEMARK OFFICE
CERTIFICATE OF CORRECTION

PATENT NO. : 7,258,780 B2 Page 1 of 1
APPLICATION NO. : 10/880196
DATED : August 21, 2007
INVENTOR(S) : Filho and Braga It is certified that error appears in the above-identified patent and that said Letters Patent is hereby corrected as shown below:

In the Claims:

Column 6, line 8, "the; and" should read -- the members; and --

Column 6, line 23, "sothat" should read -- so that --

Signed and Sealed this

Seventeenth Day of June, 2008

JON W. DUDAS
*Director of the United States Patent and Trademark Office*